United States Patent [19]

Bernett

[11] Patent Number: 4,924,976

[45] Date of Patent: May 15, 1990

[54] TUNED ARRAY VIBRATION ABSORBER

[75] Inventor: Frank Bernett, Colorado Springs, Colo.

[73] Assignee: Digital Equipment Corporation, Maynard, Mass.

[21] Appl. No.: 93,219

[22] Filed: Sep. 4, 1987

[51] Int. Cl.⁵ .............................................. F16F 7/10
[52] U.S. Cl. ...................................... 188/378; 267/141
[58] Field of Search .............................. 360/97, 98, 99;
181/207, 208, 211, 202, 209; 267/140.1–141.7,
136, 153, 280, 292–294, 41; 188/264 R, 378,
379, 380; 74/574; 248/636, 562; 310/326, 329

[56] References Cited

U.S. PATENT DOCUMENTS

| | | | |
|---|---|---|---|
| 2,126,704 | 8/1938 | Schmidt | 267/141.1 X |
| 2,655,005 | 10/1953 | Kinneman | 267/141.1 X |
| 2,702,703 | 2/1955 | Franceschetti | 267/141.1 X |
| 2,724,983 | 11/1955 | O'Connor | 188/378 X |
| 3,006,627 | 10/1961 | Paulsen | 267/280 |
| 3,160,549 | 12/1964 | Caldwell et al. | 181/207 X |
| 3,480,268 | 11/1969 | Fishbaugh | 267/141.1 |
| 3,519,260 | 7/1970 | Irwin | 267/280 X |
| 3,770,291 | 11/1973 | Kramer | 267/280 X |
| 3,882,541 | 5/1975 | Ghose et al. | 360/78 |
| 4,032,202 | 6/1977 | Ishikawa et al. | 267/280 X |
| 4,150,588 | 4/1979 | Brewer | 74/574 |
| 4,230,291 | 10/1980 | Marshall, II | 267/136 X |
| 4,318,145 | 3/1982 | Frandsen | 360/98 X |
| 4,340,835 | 7/1982 | Nakamura et al. | 310/326 X |
| 4,346,597 | 8/1982 | Cullen | 310/329 X |
| 4,364,594 | 12/1982 | Raquet | 74/574 X |
| 4,365,770 | 12/1982 | Mard et al. | 188/378 X |
| 4,373,608 | 2/1983 | Holmes | 181/202 |
| 4,392,681 | 7/1983 | Raquet | 181/209 X |
| 4,420,371 | 12/1983 | Dahl et al. | 162/272 |
| 4,470,121 | 9/1984 | Ebert | 188/322.5 X |
| 4,525,081 | 6/1985 | Myhre | 267/141.2 X |
| 4,550,589 | 11/1985 | Wright, Jr. | 188/378 X |
| 4,553,884 | 11/1985 | Fitzgerald et al. | 408/143 |
| 4,583,912 | 4/1986 | Ball et al. | 415/119 |
| 4,593,501 | 6/1986 | Delfosse | 188/378 X |
| 4,603,985 | 8/1986 | Helinski et al. | 188/378 X |
| 4,626,730 | 12/1986 | Hubbard, Jr. | 310/326 |
| 4,627,635 | 12/1986 | Koleda | 188/268 X |
| 4,635,882 | 1/1987 | Sen Gupta et al. | 188/378 X |
| 4,639,009 | 1/1987 | Meatto et al. | 280/610 X |
| 4,659,069 | 4/1987 | Odobasic | 267/282 X |
| 4,694,650 | 9/1987 | Vincent | 188/380 X |
| 4,706,788 | 11/1987 | Inman et al. | 248/636 X |
| 4,734,079 | 3/1988 | Viets | 74/574 X |

FOREIGN PATENT DOCUMENTS 1068636  1/1984  U.S.S.R. ......................... 267/141.1

OTHER PUBLICATIONS

"Vibration Damping Short Course Notes", from University of Dayton Research Institute.
"Response and Damping of a Simple Beam with Tuned Dampers", 42 Journal of the Acoustical Society of America No. 1, pp. 50–53, (Jul. 1967).

Primary Examiner—Douglas C. Butler
Attorney, Agent, or Firm—Kenyon & Kenyon

[57] ABSTRACT

A tuned vibration absorber comprises a laminated constrained layer beam formed from at least two rigid plates joined together by a layer of elastomer. One end of the laminated structure is mounted in a rigid base so that the laminated structure forms a cantilever constrained layer beam. The lamianted constrained beam is constructed so as to vibrate normal to the laminated structure at a resonance frequency that is to be dampened. The elastomer layer converts the vibrational kinetic energy into heat so that the heat can be removed. An array of tuned vibration absorbers is formed so as to damp a wide range of frequencies. The resonance frequencies of the tuned vibration absorbers are regularly spaced about the resonance frequency. The tuned array vibration absorber thus absorbs some of the vibrational kinetic energy and disperses the remainder over a wide range of frequencies to reduce the maximum amplitude of the vibrations that occur at any one frequency.

14 Claims, 3 Drawing Sheets

TUNED ARRAY VIBRATION ABSORBER

BACKGROUND OF THE INVENTION

1. Field of the Invention

The present invention relates to a tuned array vibration absorber. Specifically, a cantilever constrained layer damping beam is formed by mounting a laminated structure in a rigid base. The dampening beam damps the vibrational kinetic energy that is traverse to its laminar layers at a discrete frequency. An array of dampening beams absorbs some of the vibrational kinetic energy and disperses the remaining vibrational kinetic energy over a broader frequency range.

2. Description of related art

Many objects vibrate at a discrete resonance frequency. It is often necessary to damp the resonance vibrations. For example, the actuator of a disk drive undergoes rapid acceleration and deceleration as it seeks its prescribed track on the disk. The sudden stopping causes the actuator to vibrate at a predetermined resonance frequency. The resonance vibrations can cause the read head to erroneously read adjacent tracks on the disk. Both the speed and accuracy of a disk drive are thus limited by the time required for the resonance vibration of the actuator to damp out.

Different techniques have been tried to damp out the resonance vibrations of the actuator coil of a disk drive. One solution moves a high density mass through grease so that fluid friction removes vibrational energy from the actuator coil. The grease dampening, however, damps all frequencies of vibration to the same extent and therefore does not discriminate in favor of the resonance vibrations.

Another solution is to make part of the structure to be damped from a vibration absorbing material. This solution has several disadvantages. It may not be practical to incorporate vibration absorbing material into a structure. The vibration absorbing material often reduces the strength of the structure because damping material is generally less rigid than the material it replaces.

SUMMARY OF THE INVENTION

The present invention relates to a cantilever constrained layer damping beam that damps out kinetic energy at a particular vibration frequency. The resonance frequency of the tuned vibration absorbers is determined, i.e. "tuned", during manufacture by adjusting various physical parameters. The weight of the vibration absorber need be only a small fraction of the object being damped.

A tuned array vibration absorber according to the present invention is formed from an array of individual tuned vibration absorbers, each of which comprises at least two metal plates that are bonded to an elastomer to form a laminated structure. One end of the laminated structure is mounted in a rigid base while the other end is free to vibrate. The laminated structure and rigid base form the cantilever constrained layer damping beam. The composition and dimensions of the laminated layers are chosen so that the tuned array vibration absorber has a resonance frequency that corresponds to the resonance frequency of the object being dampened. The vibration of the laminated structure converts vibrational energy into heat in the elastomer layer.

The tuned vibration absorbers can be mounted on the actuator coil of a disk drive, or any other object, to damp its resonance vibrations. Each tuned vibration absorber is highly sensitive to operating temperature due, in part, to the wide variation with temperature in resiliency of the elastomer layer. It is therefore preferred to mount a plurality of tuned vibration absorbers on the actuator coil to form the array. Each vibration absorber is tuned during manufacture to vibrate at the resonance frequency of the actuator coil at a particular operating temperature. At least one vibration absorber is tuned to vibrate at the frequency of the actuator coil at any given operating temperature within a predetermined operating range. A systematic warming or cooling of the disk drive thus causes a second vibration absorber to begin vibrating near the resonance peak of the actuator coil as the resonance frequency of the first vibration absorber shifts away from the frequency of the actuator coil. Each vibration absorber has the shape of a radiator so as to dissipate the thermal energy from the elastomer layer.

An array of tuned vibration absorbers has particular utility when the vibration frequency of each tuned vibration absorber is closely and evenly spaced about the resonance frequency of an object being damped. Each vibration absorber in the array absorbs vibrational energy at a particular frequency and shifts the remaining vibrational energy to both higher and lower frequencies. The tuned array vibration absorber thus reduces the total vibrational kinetic energy and disperses the remaining vibrational kinetic energy over a wide range of frequencies. The amplitude of the vibrations are therefore reduced. The tuned array vibration absorber formed from the cantilever constrained layered dampening beams is lightweight and easy to mount on any object such as the actuator coil of a disk drive.

DETAILED DESCRIPTION OF THE PREFERRED EMBODIMENT

Figure 1:
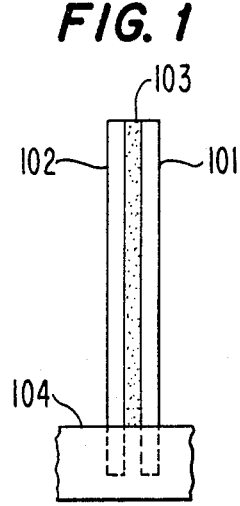
FIG. 1 shows a tuned vibration absorber according to the present invention.

FIG. 1 shows an embodiment of the present invention that is particularly well adapted for dampening vibrations of the actuator coil in a disk drive. A first rigid layer 101 is bonded to a second rigid layer 102 by a layer of elastomer 103 to form a laminated structure. The laminated structure is mounted on rigid base 104. The rigid base and laminated structure form a cantilever constrained layer damping beam that functions as a tuned vibration absorber.

The dampening characteristics of the tuned vibration absorber are determined by several parameters. The length, thickness and composition of the plates determines the resonance frequency of the constrained layer damping beam. The resilience of the elastomer also determines the resonance frequency of the tuned vibration absorber. The resiliance undergoes significant change with temperature. The temperature of the tuned vibration absorber is therefore a parameter. The laminated structure can be treated as a composite beam for purposes of determining its vibrational behavior. One skilled in the art can readily adjust the appropriate parameters to determine the vibrational behavior for a particular composite beam. The resonance frequency of the vibration absorber should correspond to the resonance frequency of the object being damped, e.g. the actuator coil of a disk drive. The vibration absorber damps only those vibrations that are transverse to the laminar layers.

One embodiment of the present invention that is particularly insensitive to temperature variations uses a laminate structure where the rigid layers are steel and aluminum plates. Each plate is approximately 0.025" thick, ¼" long and ¼" wide. Elastomer layer 103 comprises IDS 110 isomeric dampening material manufactured by the 3M Company.

Figure 2:
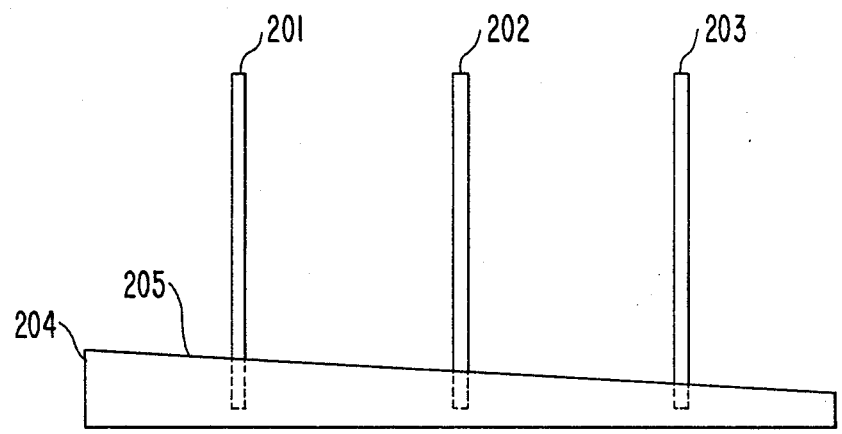
FIG. 2 shows an array of tuned vibration absorbers of the type shown in FIG. 1.

FIG. 2 shows an array of three tuned vibration absorbers 201-203 mounted on a rigid base 204. A bevelled surface 205 is cut into base 204. Each tuned vibration absorber 201-203 therefore has a slightly different length. The difference in length causes a difference in the resonance frequency of each tuned vibration absorber. All the tuned vibration absorbers are nevertheless tuned to near a predetermined resonance frequency. In one embodiment of the present invention, the tuned array vibration absorber is formed from a laminar structure in which each tuned vibration absorber has a thickness of 0.025" and separated from each other by a distance of 0.1". The change in length between adjacent vibration absorbers is approximately 0.025".

Figure 3:
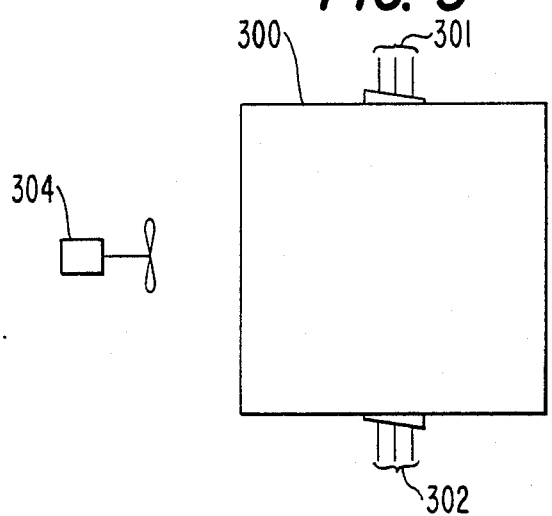
FIG. 3 shows two arrays of tuned vibration absorbers of the type shown in FIG. 2 mounted on the actuator coil of a disk drive.

FIG. 3 shows two arrays of tuned vibration absorbers 301 and 302 on the actuator coil 300 of a disk drive. The vibration absorbers damp vibrations in the horizontal plane of the actuator coil at the resonance frequency of the coil. A fan 304 provides air circulation around the tuned vibration absorbers to remove any excess heat generated in the elastomer layers.

The constrained layer beams are preferably constructed to operate over different temperature regions covering the full operating range of the disk drive. In the embodiment of the invention shown in FIG. 3, six constrained layer beams are tuned so that at least three beams are at or near the resonance frequency of the actuator coil.

The laminar structure of each tuned vibration absorber removes kinetic energy from the actuator coil by converting it into heat in the elastomer layer. A tuned vibration absorber thus could overheat if the elastomer layer absorbed too much heat too quickly. The increased temperature of a vibration absorber would shift its resonance frequency away from the resonance frequency of the actuator coil. The operating temperature of the disk drive, however, would not significantly increase. The overheating of an entire array of tuned vibration absorbers thus could cause the actuator coil to temporally lose all damping. The rate at which the tuned vibration absorber can dissipate heat must therefore always exceed the rate at which the elastomer layer needs to absorb heat.

The tuned vibration absorber of the present invention overcomes the possibility of overheating by adopting the shape of a radiator. Each tuned vibration absorber has the shape of a radiator fin with thermally conductive metal plates conducting heat away from the elastomer layer. Additional ventilation means, such as fan 304, can circulate air around the tuned vibration absorber to facilitate the removal of thermal energy by convective transfer.

Additional layers of metal plates and elastomer could be added to the tuned vibration absorber shown in FIG. 1. The additional layers could be constructed so as to vibrate over different temperature ranges. However, additional layers could decrease the efficiency of a tuned vibration absorber for any given temperature range due to the increased rigidity of the vibration absorber caused by the additional layers of non-resonance material. The additional layers could also reduce the ability of the laminar structure to dissipate heat. It is therefore preferred that a tuned array vibration absorber comprise multiple constrained layer beams so that the resonance behavior of at least one beam matches the resonance frequency of the actuator coil over the working range of the temperature of the disk drive.

Figure 4A:
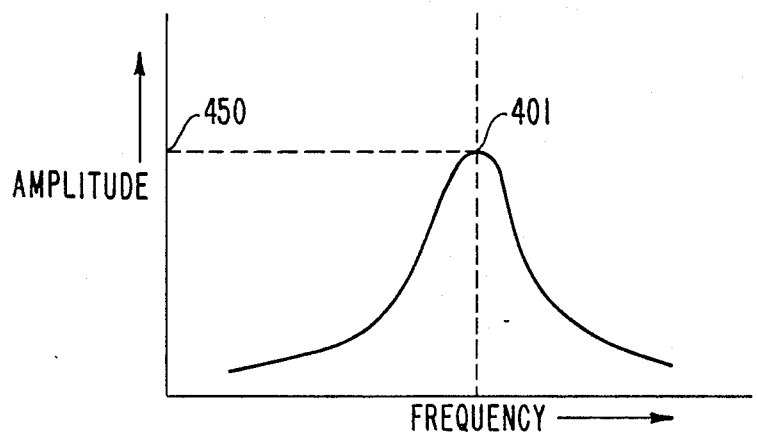
FIGS. 4a, 4b and 4c show the effect of an array of tuned vibration absorbers of the present invention on the resonance behavior of the actuator coil of a disk drive.
Figure 4B:
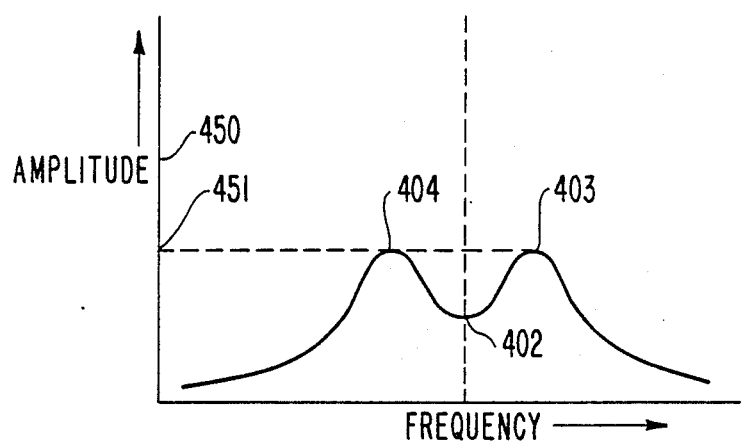

FIG. 4a represents the frequency distribution of an undampened actuator coil around its resonance frequency. FIG. 4b represents the frequency distribution for an actuator coil that is dampened with only two tuned vibration absorbers. The tuned vibration absorber converts the resonance maxma 401 into a local frequency minima 402 and spreads the vibrational energy over a wider range of frequencies as represented by local maxima 403 and 404 of FIG. 4b. The amplitude 451 of local maxima 403 and 404 is less than the amplitude 450 of maxima 401. The decrease in resonance vibration has the beneficial effect of reducing the overall vibration of the actuator coil. The tuned array vibration absorber works by absorbing vibrational kinetic energy and by spreading the remaining vibrational kinetic energy over a wider frequency range so that the frequency maxmina have a lower amplitude.

Figure 4C:
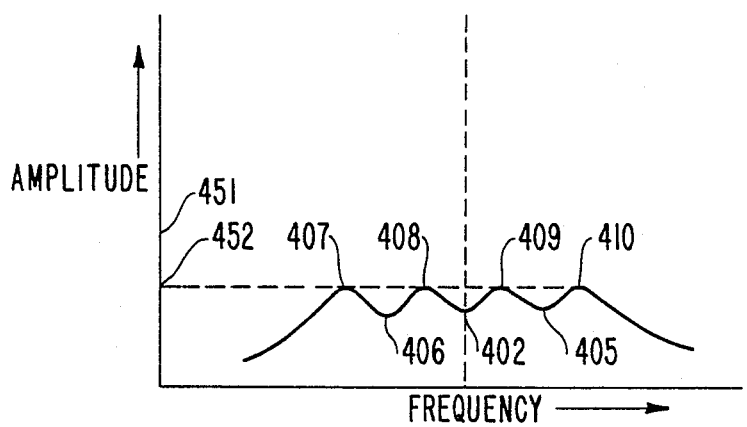

FIG. 4c represents the frequency distribution of an actuator coil that is dampened with three tuned vibration absorbers of the type that comprise the tuned array vibration absorber shown in FIG. 2. Local frequency maxima 403 and 404 have been replaced by local frequency minima 405 and 406, respectively. Local vibration maxima 407-410 are now present. The amplitude 452 of frequency maxima 407-410 is less than the amplitude 451 of vibration maxima 403 and 404 shown in FIG. 4b. The vibrational kinetic energy is dispersed over a wider range of frequencies. Additional tuned vibration absorbers could further reduce the amplitude of the vibrations and further disperse the vibrational kinetic energy.

The tuned vibration absorber of the present invention does not decrease the mechanical strength of the object on which it is mounted. The cantilevered nature of the constrained layer beams permits attaching the tuned vibration absorber to a structure rather than requiring building the dampening material intrigal therewith. Further, the mass of the tuned array of vibration absorbers can be substantially less than the mass of the object being damped. For example, the array of six tuned vibration absorbers for the actuator coil of a disk drive shown in FIG. 2 need have only 1/250 the mass of the actuator coil. The damping structure thus does not interfere with the operation of the actuator.

The principles, preferred embodiments and modes of operation of the present invention have been described in the foregoing specification. The invention which is intended to be protected herein should not, however, be construed as limited to any particular embodiment described, such as an actuator coil for a disk drive, because it is to be regarded as illustrative rather than restrictive. One skilled in the art will readily appreciate that the tuned vibration absorber and array disclosed herein could damp any object. Variations and changes to the disclosed embodiment may be made by one skilled in the art without departing from the spirit of the invention. Accordingly, the foregoing detailed description should be considered exemplary in nature and not as limiting to the scope and spirit of the invention set forth in the appended claims.

What is claimed is:

1. A tuned vibration absorber mounted to an object to damp vibrations of the object, comprising;

at least first and second layers of rigid material;

at least one layer of elastomer material between said at least two rigid layers to form a laminated constrained layer beam;

means for rapidly accelerating and decelerating the object; and a rigid base to support one end of said laminated constrained layer beam to form a cantilever constrained layer that vibrates at a predetermined resonance frequency, said base further securing said cantilever constrained layer beam to the object.

2. A tuned vibration absorber as claimed in claim 1, wherein said first and second layers are metal.

3. A tuned vibration absorber as claimed in claim 2, wherein said first layer is steel and said second layer is aluminum.

4. A tuned vibration absorber as claimed in claim 3, further comprising means for dissipating heat from said elastomer layer.

5. A tuned vibration absorber as claimed in claim 4, wherein said heat dissipation means comprises a fan for circulating air.

6. A tuned vibration absorber as claimed in claim 1, wherein the means for rapidly accelerating and decelerating the object comprises an actuator for a disk drive.

7. A tuned array vibration absorber, comprising:

two or more tuned vibration absorbers, each tuned vibration absorber being tuned to preferentially absorb vibrations occurring at a discrete resonance frequency, said discrete resonance frequency of each tuned vibration absorber being spaced apart so as to disperse any remaining vibrational kinetic energy over a broader frequency range, said resonance frequency range corresponding to a predetermined resonance frequency range of an object on which said tuned array vibration absorber is mounted, each tuned vibration absorber comprising:

at least first and second layers of rigid material;

at least one layer of elastomer material between said at least rigid layers to form a laminated constrained layer beam;

a rigid base to support one end of said laminated constrained layer beam to form a cantilever constrained layer beam that vibrates at said predetermined resonance frequency;

each of said vibration absorbers being tuned to vibrate near said predetermined resonance frequency range within a predetermined temperature range so that said at least two vibration absorbers vibrate within said resonance frequency range at any temperature within said predetermined temperature range.

8. A tuned array vibration absorber as claimed in claim 7, wherein said object is an actuator for a disk drive.

9. A tuned array vibration absorber as claimed in claim 7, wherein said tuned array vibration absorber is mounted on the actuator coil of a disk drive.

10. A tuned array vibration absorber as claimed in claim 9, further comprising means for dissipating heat.

11. A tuned array vibration absorber as claimed in claim 10, wherein said heat dissipation means comprises a fan for circulating air.

12. A tuned array vibration absorber as claimed in claim 11, wherein said array comprises two sets of three vibration absorbers each.

13. A tuned array vibration absorber as claimed in claim 7, wherein three or more tuned vibration absorbers are tuned to vibrate near said resonance frequency.

14. A tuned array vibration absorber, comprising:

two or more tuned vibration absorbers, each tuned vibration absorber being tuned to preferentially absorb vibrations occurring at a discrete resonance frequency, said discrete resonance frequency of each tuned vibration absorber being spaced apart so as to disperse any remaining vibrational kinetic energy over a broader frequency range, said resonance frequency range corresponding to a predetermined resonance frequency range of an object on which said tuned array and vibration absorber is mounted, each tuned vibration absorber comprising:

at least first and second layers of rigid material;

at least one layer of elastomer material between said at least rigid layers to form a laminated constrained layer beam;

a rigid base to support one end of said laminated constrained layer beam to form a cantilever constrained layer beam that vibrates at said predetermined resonance frequency;

each of said vibration absorbers being tuned to vibrate near said predetermined resonance frequency range.

* * * * *